United States Patent [19]

King et al.

[11] Patent Number: 5,366,151

[45] Date of Patent: Nov. 22, 1994

[54] HYBRID VEHICLE FUEL VAPOR MANAGEMENT APPARATUS

[75] Inventors: Edward T. King, Dearborn; Larry R. Brandenburg, Northville, both of Mich.

[73] Assignee: Ford Motor Company, Dearborn, Mich.

[21] Appl. No.: 173,240

[22] Filed: Dec. 27, 1993

[51] Int. Cl.$^5$ .................................................. B60H 1/04
[52] U.S. Cl. ................................. 237/2 A; 237/12.3 C
[58] Field of Search ............ 237/2 A, 12.3 A, 12.3 C

[56] References Cited

U.S. PATENT DOCUMENTS

| | | | |
|---|---|---|---|
| 3,913,545 | 10/1975 | Haase et al. | 123/136 |
| 4,009,985 | 3/1977 | Hirt | 431/5 |
| 4,292,020 | 9/1981 | Hirt | 431/5 |
| 4,641,623 | 2/1987 | Hamburg | 123/518 |
| 4,748,959 | 6/1988 | Cook et al. | 123/520 |
| 4,883,226 | 11/1989 | Tomita et al. | 237/12.3 C |
| 4,886,026 | 12/1989 | Cook | 123/478 |
| 5,048,492 | 9/1991 | Davenport et al. | 123/489 |
| 5,048,493 | 9/1991 | Orzel et al. | 123/489 |
| 5,054,454 | 10/1991 | Hamburg | 123/520 |
| 5,060,621 | 10/1991 | Cook et al. | 123/520 |
| 5,067,469 | 11/1991 | Hamburg | 123/520 |
| 5,080,078 | 1/1992 | Hamburg | 123/521 |
| 5,090,388 | 2/1992 | Hamburg et al. | 123/489 |
| 5,203,300 | 4/1993 | Orzel | 123/339 |
| 5,215,055 | 6/1993 | Orzel | 123/339 |
| 5,228,421 | 7/1993 | Orzel | 123/339 |
| 5,245,978 | 9/1993 | Orzel | 123/674 |
| 5,277,365 | 1/1994 | Schattenberg et al. | 237/12.3 C |

*Primary Examiner*—William E. Tapolcai
*Attorney, Agent, or Firm*—Roger L. May; Damian Porcari

[57] ABSTRACT

An apparatus is disclosed for heating the interior of a motor vehicle capable of being powered by electricity or a liquid fuel. A canister stores vapors released from a vehicle fuel tank, and a heater in communication with the canister burns the vapors stored therein to generate heated exhaust gases. Coolant is circulated between a heating coil where the coolant absorbs heat from the heated exhaust gases and a heater core where at least a portion of the heat absorbed by the coolant is transmitted to the interior of the vehicle. A system controller receives a first input indicating a demand for heat in the interior of the vehicle, a second input indicating the state of charge of an electrical storage battery, and a third input indicating a time interval since the canister was previously purged. The system controller signals an ignitor to begin combustion in the heater if the first input indicates a demand for heat, the second input indicates the state of charge of the battery is high, and the third input indicates a time interval greater than a predetermined amount.

18 Claims, 1 Drawing Sheet

HYBRID VEHICLE FUEL VAPOR MANAGEMENT APPARATUS

TECHNICAL FIELD

This invention relates in general to hybrid motor vehicles operable by either an electric motor or a liquid fuel powered internal combustion engine, and in particular to such a hybrid motor vehicle having a fuel vapor management system for the internal combustion engine.

BACKGROUND ART

Liquid hydrocarbon fuels, and in particular gasoline, consist of a multitude of components having a wide range of boiling points and volatilities. During normal operation of a motor vehicle having an internal combustion engine, the gasoline in the vehicle's fuel tank produces fuel vapors. Currently, all gasoline powered automobiles are required to be equipped with fuel vapor recovery systems to trap the fuel vapors produced during operation before they can escape into the environment. Future regulations are likely to require vehicles to recover and store even the fuel vapors generated during vehicle refueling.

Hybrid motor vehicles typically consist of one or more electric traction motors that drive the wheels of the vehicle, storage batteries to supply electrical energy to the traction motor, and some sort of generator or alternator driven by the internal combustion engine to charge the batteries and/or to provide power for the traction motor. The combination of the engine and the generator/alternator, known as an auxiliary power unit (APU) or range extender, provides a means for converting the chemical energy of the engine's liquid fuel into electrical energy.

Hybrid vehicles utilizing volatile liquid fuels will probably also be required to have a vapor recovery system. Vapor recovery systems typically purge the fuel vapors from a storage canister into the engine every time the vehicle is started. Hybrid vehicles, however, experience unique problems in purging their vapor recovery systems. For example, if the vehicle batteries have a relatively large storage capacity, the APU usually need not be turned on every time the vehicle is used. Therefore, opportunities for vapor purging may occur only at long and irregular intervals. Under such conditions the vapor recovery system may become overloaded, and release fuel vapors into the atmosphere. A less than ideal means of purging the vapor recovery system is to start the APU at regular intervals, for the sole purpose of consuming the stored vapors, regardless of the need of the vehicle for electricity. Such extraneous start-ups, however, shorten engine life and produce unnecessary exhaust emissions.

In a conventional automobile, heat for the passenger compartment is extracted from engine coolant being circulated through a heater core, and is soon available after vehicle start-up. In a hybrid vehicle, APU engine start-up is independent from vehicle start-up, making engine heat an unreliable source for passenger heat on initial vehicle driveaway. Furthermore, the energy storage capability of current battery technology severely limits the practicality of electric passenger heaters because their large electrical energy requirement significantly diminishes the vehicle's electric only driving range capability.

SUMMARY OF THE INVENTION

The present invention is an apparatus for heating the interior of a motor vehicle capable of being powered by electricity or a liquid fuel. The apparatus comprises a fuel tank, a canister, a heater and a circuit for circulating a heat transfer medium. The fuel tank stores the liquid fuel to be supplied to an internal combustion engine, while the canister stores vapors released from the fuel tank. The heater is in communication with the canister, and is adapted to combust the vapors stored therein to generate heated exhaust gases. Finally, the heat transfer medium is circulated between a first location where the medium absorbs heat from the heated exhaust gases generated by the heater and a second location where at least a portion of the heat absorbed by the medium may be transmitted to the interior of the vehicle.

Accordingly, it is an object of the present invention to provide an apparatus of the type described above which reduces engine wear and emissions created by starting an internal combustion engine to purge fuel vapors stored by a vehicle fuel vapor recovery system.

Another object of the present invention is to provide an apparatus of the type described above that produces passenger heat requirements from a heater supplied at least in part by stored fuel vapors.

Still another object of the present invention is to provide an apparatus of the type described above which allows the use of a canister of relatively small size and long life.

These and other objects, features, and advantages of the present invention are readily apparent from the following detailed description of the best mode for carrying out the invention when taken in connection with the accompanying drawing.

BEST MODE FOR CARRYING OUT THE INVENTION

Figure 1:
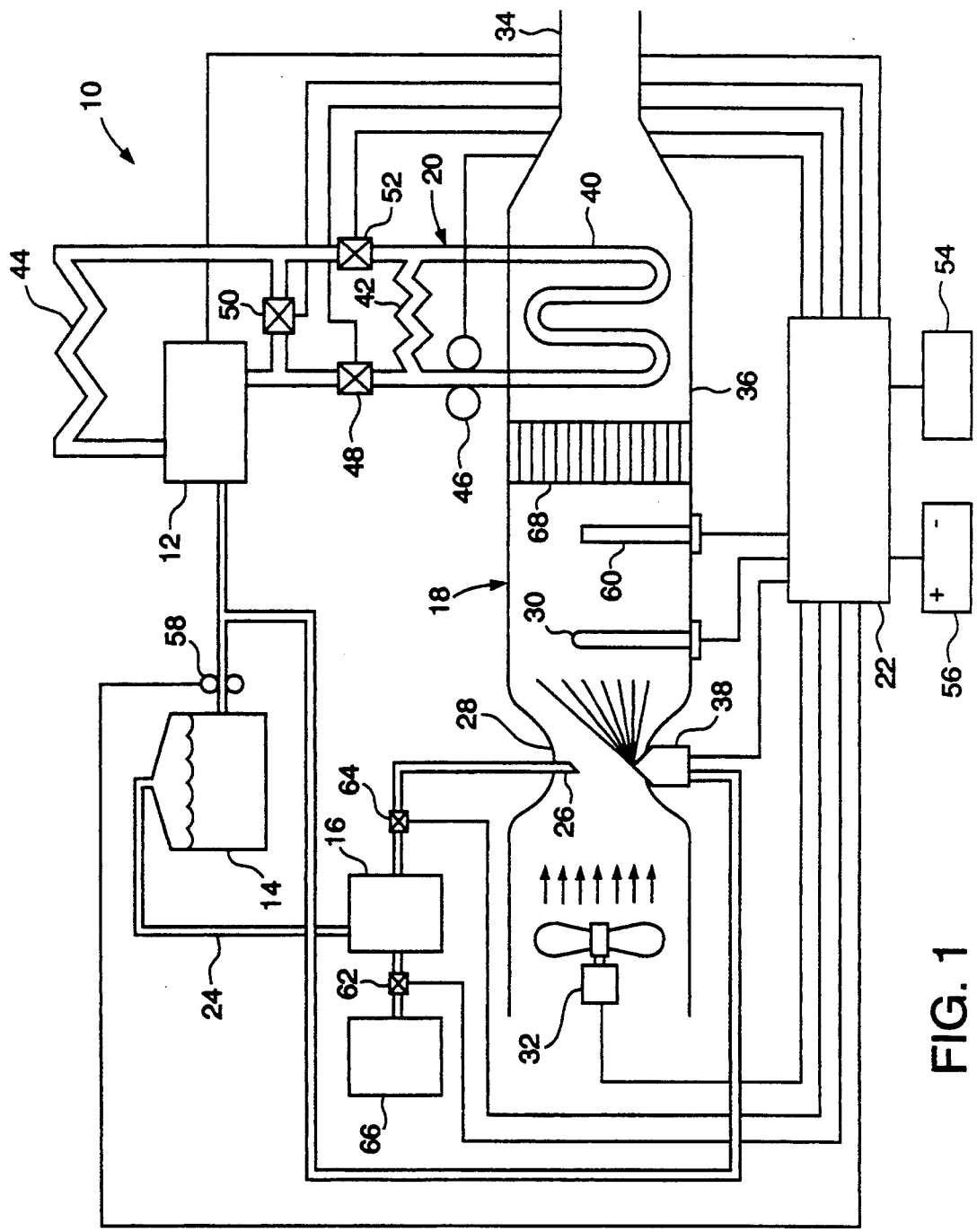
FIG. 1 is a schematic view of an apparatus according to the present invention for managing the fuel vapors produced in the liquid fuel tank of a hybrid motor vehicle.

With reference to the drawing, the preferred embodiments of the present invention will be described. FIG. 1 shows a fuel vapor management apparatus 10 according to the present invention for heating the interior of a hybrid motor vehicle capable of being powered either by one or more electric motors (not shown), or by an auxiliary power unit (APU) 12 including a conventional internal combustion engine. The apparatus 10 comprises a fuel tank 14, a carbon canister 16, a heater 18, a coolant circuit 20, and a microprocessor based system controller 22.

The fuel tank 14 stores a volatile liquid fuel, such as gasoline, to be supplied to the internal combustion engine 12. The canister 16 is in communication with the fuel tank 14 through a tank vapor vent 24, and includes activated charcoal which adsorbs hydrocarbon vapors released from the fuel tank or generated during refueling and trapped by the vehicle's fuel vapor recovery system.

The heater 18 includes a nozzle 26 for injecting vapors from the canister 16 into a venturi 28, as well as an ignitor 30 adapted to combust the vapors to generate heated exhaust gases. A fan and motor assembly 32 are provided to direct an incoming air flow through the heater 18, and to direct the exhaust gases out through an exhaust port 34 in a housing 36 of the heater. Preferably, a fuel injector 38 in communication with the fuel tank 14 is also provided proximate the venturi 28 to aid in heater start-up and operation, as described below.

The coolant circuit 20 includes a heating coil 40 located in the heater housing 36, and a heater core 42 situated in or near the interior of the vehicle. The heater core 42 is preferably a conventional component of the APU cooling system, which also includes a radiator 44. A coolant circulation pump 46 circulates an appropriate heat transfer medium, preferably a conventional engine coolant such as a standard glycol and water mixture, through the coolant circuit 20 and, depending on the status of control valves 48, 50 and 52, through the APU cooling system as well.

The system controller 22 receives a first input indicative of a demand for heat. The demand for heat may originate from either a manual heater control 54 or a sensor of an automatic climate control system to indicate a need for passenger heat or window defrosters, or from any other control indicating a need for heat in the interior of the vehicle. The system controller 22 also receives a second input indicative of the capacity remaining in an energy storage device. In a preferred embodiment, this input indicates the state of charge of an electrical storage traction battery 56. Preferably, the system controller 22 also receives a third input indicative of a time interval since the canister 16 was previously purged. This time interval may also be generated from an internal clock and a software algorithm specifically designed to keep track of time.

If the first input indicates a demand for heat, and the second input indicates that the capacity remaining in the energy storage device is low (e.g. the state of charge of the battery 56 is high), the system controller 22 assumes that the probability of starting the APU 12 is low. Next the system controller 22 determines from the third input, generally a signal from its own memory, the time interval since the last canister purge event. If the third input indicates a time interval greater than a predetermined amount, a purge of the canister 16 is presumed to be required. The system controller 22 then energizes the fan and motor assembly 32, signals the ignitor 30 to begin combustion in the heater 18, and signals a fuel pump 58 and the fuel injector 38 to begin injecting liquid fuel into the venturi 28 for heater start-up.

A heated exhaust gas oxygen sensor 60 is disposed downstream from the point of combustion in the heater 18, and communicates a fourth input to the system controller 22 indicative of the air/fuel ratio of combustion in the heater. If ignition was successful, the oxygen sensor 60 will signal an air/fuel ratio at or near stoichiometric.

The system controller 22 then energizes the coolant circulation pump 46, and closes coolant control valves 48 and 52 so that coolant circulates only through the heating coil 40 and the heater core 42, but not through the remainder of the APU cooling system. At the heating coil 40, the coolant absorbs heat from the heated exhaust gases generated by the heater 18. At the heater core 42, at least a portion of the heat absorbed by the coolant may be transmitted to the interior of the vehicle by any known means.

After a short warmup period, the system controller 22 goes into a closed loop feedback operation for fuel delivery to the heater 18. In closed loop operation, the system controller 22 opens a canister inlet valve 62 and a canister outlet valve 64 so that the vacuum in the venturi 28 draws fresh air from an air filter 66, purging fuel vapors from the canister 16 and delivering them to the combustion chamber through the nozzle 26. Such a purge flow is constantly varying in vapor quantity and constituency. Lighter and more volatile components are generally removed first from the canister 16 and at a higher rate, while heavier components are removed later and at a reduced rate.

The light and heavy components produce, all else being equal, different air/fuel ratios in the heater 18. Such air/fuel ratio changes are constantly monitored by the oxygen sensor 60, and the system controller 22 appropriately modifies the duty cycle input to the fuel injector 38, and/or the degree to which the canister valves 62 and 64 are open, to maintain the optimum desired combustion air/fuel ratio. Similar approaches for controlling the purge flow to the engine are shown in U.S. Pat. No. 4,641,623 to Hamburg, U.S. Pat. No. 4,748,959 to Cook et al. and U.S. Pat. No. 5,080,078, all assigned to the assignee of the present invention and hereby incorporated by reference. The system controller 22 is thus adapted to signal the fuel injector 38 to inject sufficient fuel from the tank 14 into the heater 18 to bring the air/fuel ratio generally to a predetermined level, preferably at or near stoichiometric, if the fourth input indicates the air/fuel ratio is below the predetermined level.

It is desirable to maintain the air/fuel ratio slightly leaner than stoichiometric. This insures an adequate supply of excess oxygen so that an oxidation catalyst 68 disposed downstream from the point of combustion can convert carbon monoxide and hydrocarbon emissions to carbon dioxide and water at maximum efficiency. Because the heater 18 is a constant combustion device, oxides of nitrogen formation remains very low, making expensive three way catalysts unnecessary.

If fuel ignition did not occur in the heater 18, the unburned fuel makes the oxygen sensor 60 signal a rich air/fuel ratio, which the system controller 22 interprets as a non-start and requires system shutdown. A fault signal is then generated by the system controller diagnostic software for later investigation.

The system controller 22 determines if the storage canister 16 has been adequately purged by comparing the instantaneous duty cycle of the fuel injector 38 during fuel vapor purge flow with a predetermined value such as the duty cycle of the fuel injector without fuel vapor purge flow. Once the injector duty cycle with purge flow on becomes equal to or greater than its duty cycle with purge flow off, the system controller 22 assumes that the canister 16 has been completely purged. The canister inlet and outlet valves 62 and 64 are then closed, and the purge cycle is complete. Such uniform purging at regular intervals allows the size of the canister 16 to be optimized to maintain minimum package volume. Furthermore, the activated charcoal in the canister 16 undergoes less deterioration with time, thus allowing a smaller canister to be fully functional over a longer period of time.

If the passenger heat requirement is reduced by the vehicle operator before the vapor purge cycle is complete, the system controller 22 opens coolant control valves 48 and 52 and closes valve 50. Heated coolant is then allowed to circulate through and preheat the APU 12 until the vapor purge cycle is complete. Such preheating of the APU can significantly reduce start-up exhaust emissions. For this purpose, the system controller 22 receives another input indicative of the temperature of the engine, such as engine coolant temperature.

To be as energy efficient as possible, the control algorithms of the system controller 22 determine the rate of change of the state of charge of the battery 56, anticipate need for the APU 12, and determine whether a vapor purge by the APU or the heater 18 is more appropriate. Utilizing the heater 18 to consume fuel vapors is based on the likelihood that a demand for passenger heat will occur more often than a demand for APU operation. If it is more appropriate for the vapor purge to be done by the APU 12, appropriate valving controlled by the system controller 22 allows a similar purging to be done by the vacuum in the APU engine's intake manifold. Such techniques are commonly used in motor vehicles, and are not detailed in this application. See, for example, U.S. Pat. No. 3,913,545, assigned to the assignee of the present invention and hereby incorporated by reference.

As another option, when the system controller 22 determines that a purge is required, but passenger heat is not required and APU start is not imminent, coolant control valves 48 and 52 are opened, valve 50 is closed, and the heat generated by the heater 18 is dissipated by the radiator 44.

While the best mode for carrying out the invention has been described in detail, those familiar with the art to which this invention relates will recognize various alternative designs and embodiments for practicing the invention as defined by the following claims.

We claim:

1. An apparatus for heating the interior of a motor vehicle capable of being powered by electricity or a liquid fuel, the apparatus comprising:
   a fuel tank for storing the liquid fuel to be supplied to an internal combustion engine;
   a canister for storing vapors released from the fuel tank;
   a heater in communication with the canister and adapted to combust the vapors stored therein to generate heated exhaust gases; and
   a circuit for circulating a heat transfer medium between a first location where the medium absorbs heat from the heated exhaust gases generated by the heater and a second location where at least a portion of the heat absorbed by the medium may be transmitted to the interior of the vehicle.

2. The apparatus of claim 1 further comprising a system controller adapted to receive a first input indicative of a demand for heat in the interior of the vehicle and a second input indicative of the capacity remaining in an energy storage device.

3. The apparatus of claim 2 wherein the system controller signals the heater to begin combustion if the first input indicates a demand for heat and the second input indicates the capacity remaining in the energy storage device is low.

4. The apparatus of claim 3 wherein the system controller is adapted to receive a third input indicative of whether the canister requires purging, and the system controller signals the heater to begin combustion if the third input indicates that the canister requires purging.

5. The apparatus of claim 4 wherein the third input is indicative of a time interval since the canister was previously purged.

6. The apparatus of claim 2 wherein the system controller is adapted to receive a fourth input indicative of the air/fuel ratio of combustion in the heater.

7. The apparatus of claim 6 wherein the fourth input is produced by an oxygen sensor disposed downstream from a point of combustion in the heater.

8. The apparatus of claim 6 wherein the system controller signals a fuel injector to inject fuel from the fuel tank into the heater if the fourth input indicates the air/fuel ratio is below a predetermined level.

9. The apparatus of claim 8 wherein the system controller signals the fuel injector to inject sufficient liquid fuel into the heater to bring the air/fuel ratio generally to the predetermined level.

10. The apparatus of claim 8 wherein the system controller determines if the canister has been adequately purged by comparing a duty cycle of the fuel injector with a predetermined value.

11. The apparatus of claim 2 wherein the system controller is adapted to receive a fifth input indicative of the temperature of the internal combust ion engine.

12. The apparatus of claim 1 wherein the first location comprises a heating coil of the heater.

13. The apparatus of claim 1 wherein the second location comprises a heater core.

14. The apparatus of claim 2 wherein the energy storage device comprises an electrical battery.

15. A fuel vapor management apparatus for heating the interior of a motor vehicle capable of being powered by electricity or a liquid fuel, the apparatus comprising:
   a fuel tank for storing the liquid fuel to be supplied to an internal combustion engine;
   a canister for storing vapors released from the fuel tank;
   a heater in communication with the canister and adapted to combust the vapors stored therein to generate heated exhaust gases;
   a circuit for circulating coolant between a heating coil where the coolant absorbs heat from the heated exhaust gases generated by the heater and a heater core where at least a portion of the heat absorbed by the coolant may be transmitted to the interior of the vehicle; and
   a system controller adapted to receive a first input indicative of a demand for heat in the interior of the vehicle, a second input indicative of the state of charge of an electrical storage battery, and a third input indicative of a time interval since the canister was previously purged;
   the system controller signalling an ignitor to begin combustion in the heater if the first input indicates a demand for heat, the second input indicates the state of charge of the battery is high, and the third input indicates a time interval greater than a predetermined amount.

16. The apparatus of claim 15 wherein the system controller is adapted to receive a fourth input produced by a heated exhaust gas oxygen sensor disposed downstream from a point of combustion in the heater indicative of the air/fuel ratio of combustion in the heater, and is adapted to signal a fuel injector to begin injecting sufficient liquid fuel into the heater to bring the air/fuel ratio generally to a predetermined level if the fourth input indicates the air/fuel ratio is below the predetermined level.

17. The apparatus of claim 16 wherein the predetermined level is stoichiometric.

18. The apparatus of claim 15 wherein the system controller determines if the canister has been completely purged by comparing a duty cycle of the fuel injector with a predetermined value.

* * * * *